US012697670B2

(12) United States Patent
Halpin

(10) Patent No.: US 12,697,670 B2
(45) Date of Patent: Aug. 4, 2026

(54) STEPPED ROTARY BROACHES AND METHODS AND SYSTEMS EMPLOYING SAME

(71) Applicant: David Halpin, Cape Coral, FL (US)

(72) Inventor: David Halpin, Cape Coral, FL (US)

( * ) Notice: Subject to any disclaimer, the term of this patent is extended or adjusted under 35 U.S.C. 154(b) by 419 days.

(21) Appl. No.: 18/376,614

(22) Filed: Oct. 4, 2023

(65) Prior Publication Data

US 2024/0399477 A1     Dec. 5, 2024

Related U.S. Application Data

(60) Provisional application No. 63/471,158, filed on Jun. 5, 2023.

(51) Int. Cl.
B23D 37/14      (2006.01)
B23D 41/04      (2006.01)
B23D 43/06      (2006.01)

(52) U.S. Cl.
CPC ............. B23D 37/14 (2013.01); B23D 41/04 (2013.01)

(58) Field of Classification Search
CPC ........ B23D 43/02; B23D 37/10; B23D 37/08; B23D 37/14; B23D 37/22; B23D 37/04; B23D 37/02; B23D 41/04; B23D 43/06; B23D 2043/063
See application file for complete search history.

(56) References Cited

U.S. PATENT DOCUMENTS

| | | | | |
|---|---|---|---|---|
| 1,148,065 A | * | 7/1915 | Warren ...................... | B21J 9/04 408/1 R |
| 2,522,440 A | * | 9/1950 | Freter .................... | B21D 28/34 29/90.01 |
| 2,683,919 A | | 7/1954 | Psenka | |
| 3,231,962 A | | 2/1966 | Psenka | |
| 3,858,482 A | * | 1/1975 | Scaduto .............. | A23C 19/061 279/6 |

(Continued)

OTHER PUBLICATIONS

Polygon Solutions Inc., "Polygon Broaching a 36 Tooth Spline into a Custom Socket" YouTube video, retrieved from the internet on or before May 31, 2023 at https://youtu.be/C5i6WteJ2wU (18 pages filed herewith).

(Continued)

*Primary Examiner* — Alan Snyder
(74) *Attorney, Agent, or Firm* — Amundsen Davis, LLC

(57) ABSTRACT

Stepped rotary broaches, and systems and methods employing such broaches, are disclosed herein. In one example embodiment, a stepped rotary broach includes a contact portion integrally formed with or coupled to a support portion. The contact portion includes a face and a periphery. The periphery includes an outer surface and a plurality of step formations, where each of the step formations extends between the face and a respective location along the periphery at which the respective step formation adjoins a respective portion of the outer surface. Each of the step formations includes a respective step including a respective surface region extending in a respective direction about a central axis of the stepped rotary broach. The respective surface regions of the respective steps are respectively positioned more closely to the central axis than are the respective portions of the respective outer surface that respectively adjoin the respective step formations.

20 Claims, 6 Drawing Sheets

(56)                    References Cited

U.S. PATENT DOCUMENTS

| | | | |
|---|---|---|---|
| 4,274,767 A | 6/1981 | Bistrick et al. | |
| 4,762,043 A | 8/1988 | Reich | |
| 10,029,321 B1 * | 7/2018 | McCarthy | ............. B23D 13/00 |
| 2013/0156514 A1 | 6/2013 | Xu | |

OTHER PUBLICATIONS

Polygon Solutions Inc., "Rotary Broaching Illustration in a Mill" YouTube video, retrieved from the internet on or before May 31, 2023 at https://youtu.be/ylxEm420TMo (9 pages filed herewith).

Polygon Solutions Inc., "Rotary Broach Form Drill" YouTube video, retrieved from the internet on or before May 31, 2023 at https://youtu.be/TRJV9CqYRdo (10 pages filed herewith).

Somma Tool, "Rotary Broaching" YouTube video, retrieved from the internet on or before May 31, 2023 at https://youtu.be/iwElhuDrRww (5 pages filed herewith).

@thang010146, "Rotary broaching 1" YouTube video, retrieved from the internet on or before May 31, 2023 at https://youtube.com/shorts/J2OAlSkHHbl?feature=share (8 pages filed herewith).

* cited by examiner

PRIOR ART
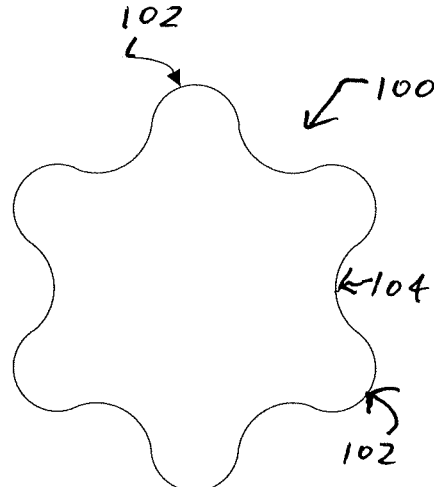
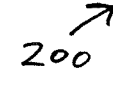
FIG. 1
PRIOR ART
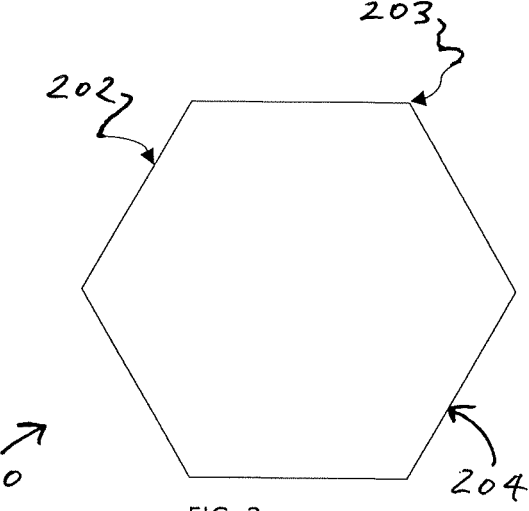
FIG. 2
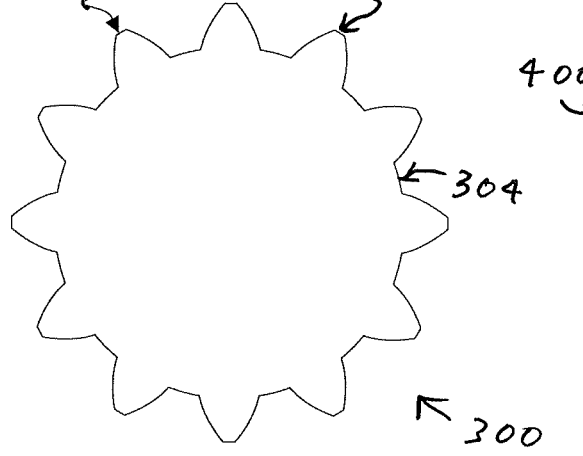
FIG. 3
PRIOR ART
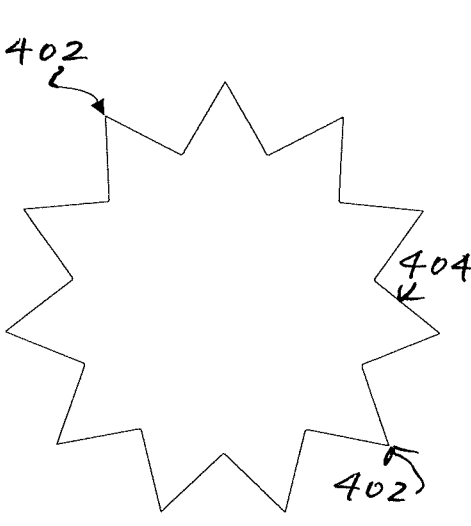
FIG. 4
PRIOR ART PRIOR ART
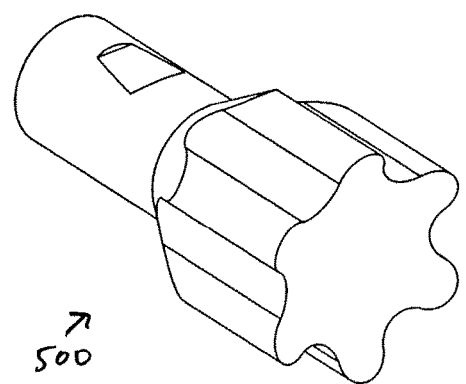
FIG. 5
PRIOR ART
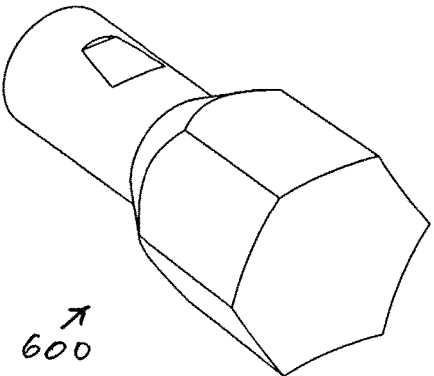
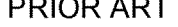
FIG. 6
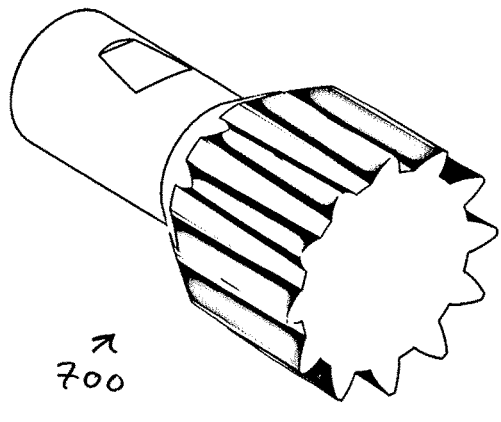
FIG. 7
PRIOR ART
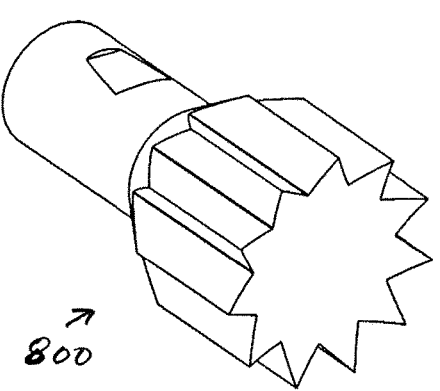
FIG. 8
PRIOR ART

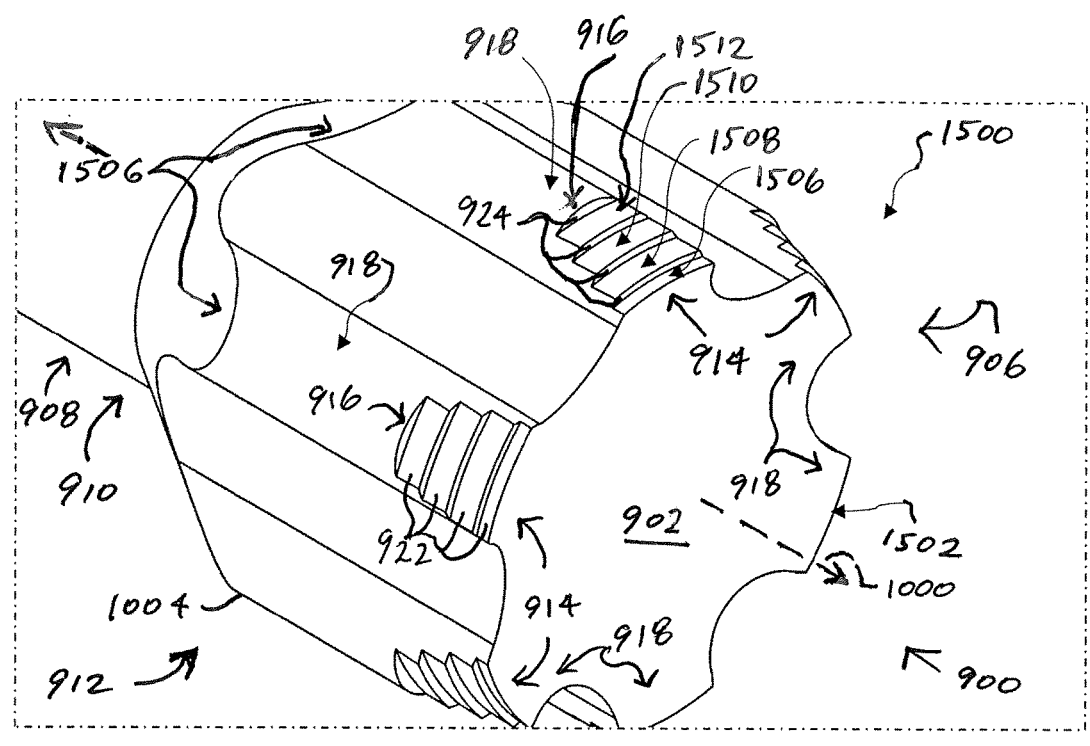
FIG. 15
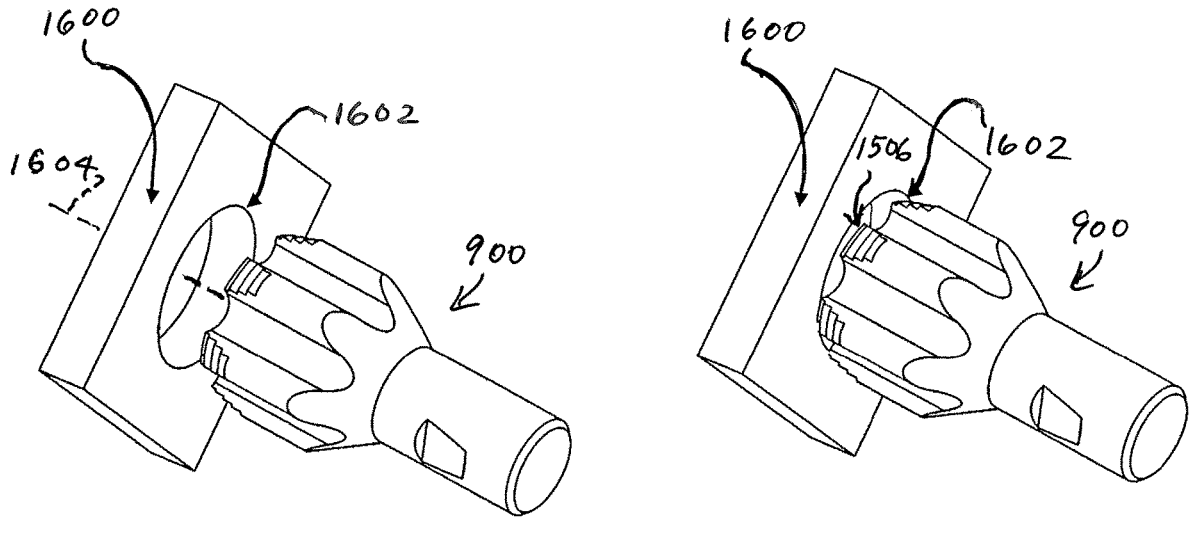
FIG. 16                                    FIG. 17

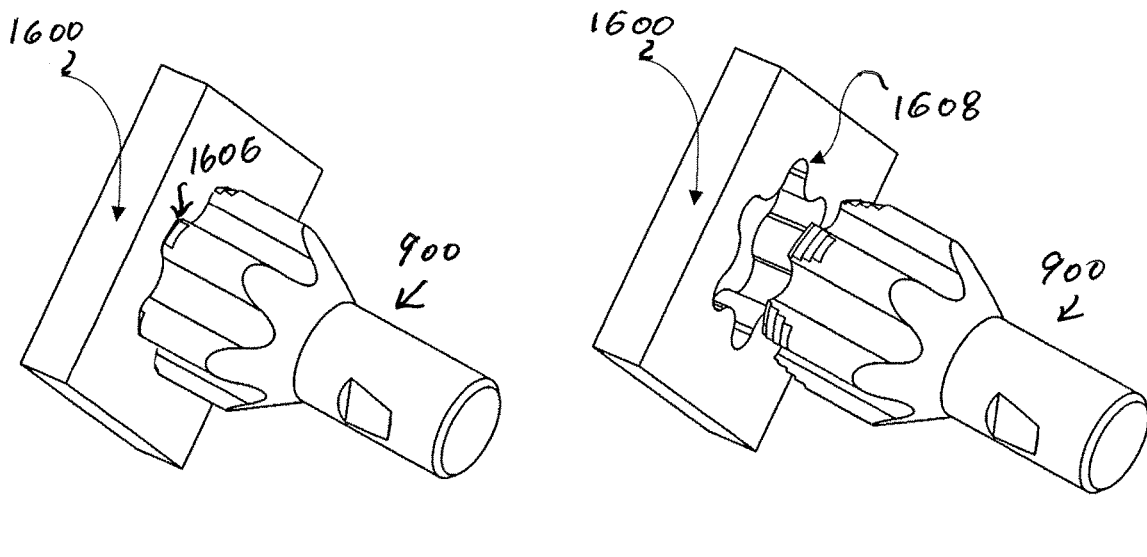
FIG. 18                                        FIG. 19
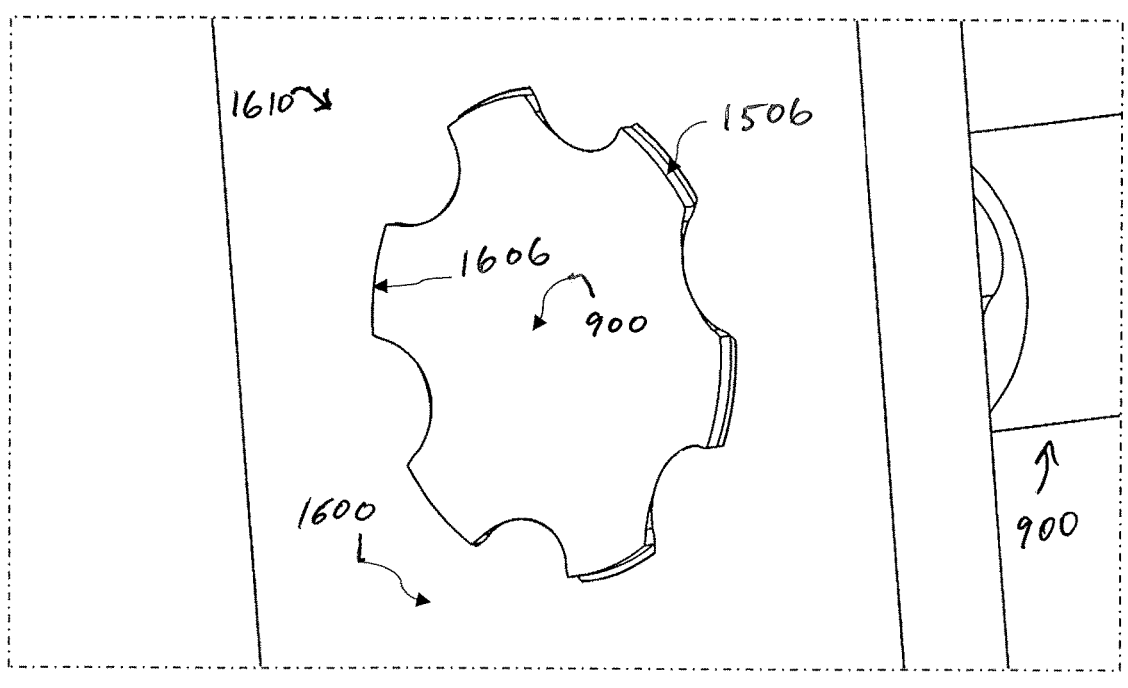
FIG. 20

STEPPED ROTARY BROACHES AND METHODS AND SYSTEMS EMPLOYING SAME

FIELD

The present disclosure relates to broaches, and methods and systems employing broaches and, more particularly, to stepped rotary broaches, and methods and systems employing stepped rotary broaches.

BACKGROUND

Broaches are used to produce polygonal shapes internally (e.g., a hole) or externally (e.g., a shaft) onto a target workpiece. There are many uses for broaches, including a variety of military, aerospace, medical, and other industrial and commercial applications.

Traditionally, there are two types of broaches, linear and rotary. A linear broach is a tool used to produce linear or straight-sided cuts in a target material. It is typically a long, narrow, round, or flat tool with a series of teeth or cutting edges along one or more sides. With a linear broach, a sequence of polygons which increase in size are pushed or pulled through a hole, in a linear manner, until the desired form size is achieved. That is, as the linear broach is pushed or pulled linearly through the hole and polygonal structures of increased size are forced through the hole, the cross-sectional size (and shape) of the hole is modified and enlarged until the hole attains a desired size (and shape).

By comparison, a rotary broach has a structure that is configured to be utilized to produce polygonal shapes through a process known as wobble broaching. To perform wobble broaching, the rotary broach is mounted in a broaching toolholder, which has a unique design to allow controlled wobbling. The toolholder is designed with a built-in offset or eccentricity that causes the broach to wobble slightly as it rotates. The wobbling motion is achieved through a combination of factors. The toolholder typically consists of a bearing or bushing that holds the broach securely while allowing it to rotate freely. The bearing or bushing is eccentrically mounted within the toolholder, such that it is not perfectly centered.

When the broaching tool is inserted into the workpiece and the machine spindle starts rotating, the eccentricity of the toolholder causes the broach to wobble. This wobbling motion is a slight deviation from the true rotational axis, creating a circular path for the cutting edges. When implementing a rotary broach, the broach is placed at a slight angle to the centerline of the workpiece. This causes the broach to cut with a chiseling or scalloping effect when the broach is rotated around the centerline of the toolholder. In use, rotary broaches do not rotate when engaged in the workpiece, but instead wobble back and forth, cutting the full form, one corner at a time. The cutting action of the rotary broach is typically a combination of rotational movement, axial feed, and slight tilting or wobbling motion. The rotary broach cuts the workpiece as it moves through the workpiece, creating the desired form.

Unlike linear broaches, rotary broaches can cut spline and polygonal forms that do not go all of the way through a workpiece (e.g., so as to form blind holes) and can also cut a form around only a portion of the length of an external surface of a shaft.

Further in regard to rotary broaches, FIG. 1, FIG. 2, FIG. 3, and FIG. 4 respectively are provided to illustrate respective front elevation views of a typical (Prior Art) hexalobe (or hexalobular) form 100, a typical (Prior Art) polygonal form 200, a typical (Prior Art) involute form 300, and a typical (Prior Art) serration form 400, respectively. Further, FIG. 5, FIG. 6, FIG. 7, and FIG. 8 respectively are provided to illustrate respective front perspective views of a Prior Art hexalobe rotary broach 500, a Prior Art polygonal rotary broach 600, a Prior Art involute rotary broach 700, and a Prior Art serration rotary broach 800, respectively, which respectively have forms corresponding to the hexalobe form 100, polygonal form 200, involute form 300, and serration form 400, respectively.

Additionally with respect to FIG. 1 and FIG. 2, it should be appreciated that splines (or lobes) on the hexalobe form 100 are respectively represented by respective protrusions 102 around a perimeter or periphery 104, and that the polygonal form (or shape) 200 has edges 202 and corners 203 (in contrast to a spline-based shape) that form a periphery 204. Further with respect to FIG. 3 and FIG. 4, it should be appreciated that the involute form 300 includes splines that are respectively represented by respective protrusions 302 arranged around a periphery 304, and also that the serration form 400 includes splines that are respectively represented by respective point protrusions 402 arranged around a periphery 404 (with it also being appreciated that some splines on serration forms have truncated tips and do not necessarily come to sharp points).

Conventional rotary broaches are not without their shortcomings. Indeed, conventional rotary broaches can require tremendous machine and tool pressure to cut large or deep forms, especially when trying to cut forms in hard metals or alloys. With a single rotary broach of conventional design, it is typically not possible to cut spline or polygonal shapes having a diameter that is greater than about 1.5 inches, or having a depth that is greater than about 1 inch. Also, when attempting to cut shapes such as those of the hexalobe, involute, and serration forms 100, 300, and 400, respectively, rotary broaches can only cut with a maximum form height of about 0.04 inches. Attempting to cut larger forms or tooth heights often exceeds the computer numerical control (CNC) machine loads or breaks the broach.

To get around or overcome such diameter and form height limits, rotary broaches have been made in sets of individual rougher and finisher broaches. Each broach is then loaded into different tool holders and positioned in a CNC machine. Although it is possible to achieve forms/shapes that are larger or deeper through the use of such sets of rotary broaches, the use of such sets of rotary broaches not only increases costs but also requires that machines hold multiple tools at the same time, taking up valuable machine resources. Additionally, achieving accurate alignment of the orientations of different broaches that are respectively loaded into different respective portions of a machine is not practical and often not possible.

For at least one or more of these reasons, or one or more other reasons, it would therefore be advantageous if improved rotary broaches, and/or improved methods and/or systems employing rotary broaches, could be developed, so as to address any one or more of the concerns discussed above or to address one or more other concerns or provide one or more benefits.

BRIEF SUMMARY

This summary is provided to introduce a variety of concepts in a simplified form that is disclosed further in the detailed description of the embodiments. This summary is not intended for determining or limiting the scope of the claimed subject matter.

At least some embodiments provided herein include a rotary broach that contains progressive steps which increase in size to cut the desired form into the workpiece. The stepped rotary broach may be comprised of a planar, conical, or dished front surface and a series of progressively larger form sizes creating steps on the splines or corners of the broach. Successively greater diameters on each spline or corner cut a larger form as the broach is wobbled through the workpiece. The first step has the smallest cutting dimension. Successive steps positioned along the length of the broach are progressively larger and are used to increase the size of the form cut into a workpiece. The increasing steps on the sides of the stepped rotary broach may accommodate various forms, including but not limited to square, hexagon, hexalobe, keyway, serration, and involute forms.

Additionally, in at least some example embodiments, the present disclosure relates to a stepped rotary broach. The stepped rotary broach includes a support portion configured to allow for the stepped rotary broach to be supported by a toolholder, and a contact portion integrally formed with or coupled to the support portion. The contact portion includes a face and a periphery, and extends between the face and the support portion, the support portion extending between the contact portion and a distal end of the stepped rotary broach. Also, the periphery includes an outer surface and a plurality of step formations, where each of the step formations extends between the face and a respective location along the periphery at which the respective step formation adjoins a respective portion of the outer surface. Each of the step formations includes a respective first step including a respective first surface region extending in a respective first direction about a central axis of the stepped rotary broach. Also, the respective first surface regions of the respective first steps are respectively positioned more closely to the central axis of the stepped rotary broach than are the respective portions of the respective outer surface that respectively adjoin the respective step formations.

Further, in at least some such example embodiments, each of the step formations includes a respective plurality of steps including the respective first step, where respective successive ones of each of the plurality of steps are arranged at respective successively greater first distances from the face and also arranged at respective successively greater second distances from the central axis. Also, in at least some such example embodiments, each of the step formations includes a respective plurality of steps that includes a respective second step in addition to the respective first step, where the respective first step of each of the step formations is located at a respective first distance from the face that is less than a respective second distance from the face at which the respective second step of the respective step formation is located, and where the respective first step of each of the step formations is located at a respective third distance from the central axis that is less than a respective fourth distance from the central axis at which the respective second step of the respective step formation is located.

Further, in at least some example embodiments, the present disclosure relates to a stepped rotary broach. The stepped rotary broach includes a support portion configured to allow for the stepped rotary broach to be supported by a toolholder, and a contact portion integrally formed with or coupled to the support portion. The contact portion includes a face and an axially-extending surface, and extends between the face and the support portion, the support portion extending between the contact portion and a distal end of the stepped rotary broach. Also, the axially-extending surface includes a first contact surface and a plurality of step formations, where each of the step formations extends between the face and a respective location along the axially-extending surface at which the respective step formation adjoins a respective portion of the first contact surface. Each of the step formations includes respective first and second steps that each include a respective first surface region extending in a respective first direction about a central axis of the stepped rotary broach. Also, the respective first surface regions of the respective first and second steps of the respective step formations are respectively positioned either closer to or farther from the central axis of the stepped rotary broach than are the respective portions of the respective first contact surface that respectively adjoin the respective step formations.

In at least some such example embodiments, the stepped rotary broach is an internal stepped rotary broach. Also, in at least some such example embodiments, the stepped rotary broach is an external stepped rotary broach.

Additionally, in at least some example embodiments, the present disclosure relates to a machining method employing a stepped rotary broach. The method includes mounting the stepped rotary broach on a toolholder in a manner such that a central axis of the stepped rotary broach is skewed relative to a rotational axis of the toolholder. The stepped rotary broach includes a support portion and a contact portion integrally formed with or coupled to the support portion, where the contact portion includes a face and a periphery, and extends between the face and the support portion, the support portion extending between the contact portion and a distal end of the stepped rotary broach. Also, the periphery includes an outer surface and a plurality of step formations, where each of the step formations extends between the face and a respective location along the periphery at which the respective step formation adjoins a respective portion of the outer surface. Further, each of the step formations includes a respective first step including a respective first surface region extending in a respective first direction about the central axis of the stepped rotary broach, where respective first surface regions of the respective first steps are respectively positioned more closely to the central axis of the stepped rotary broach than are the respective portions of the respective outer surface that respectively adjoin the respective step formations. Additionally, the method includes causing the toolholder to be activated so as to rotate the stepped rotary broach about the rotational axis. Further, the method includes initially moving the toolholder toward a workpiece having a pilot hole until the stepped rotary broach initially contacts the workpiece, the stepped rotary broach experiencing one or more wobbling movements relative to the workpiece due to the central axis being skewed relative to the rotational axis. Additionally, the method includes further moving the toolholder toward the workpiece so that the stepped rotary broach proceeds into the pilot hole and the step formations cut away at the workpiece due to the one or more wobbling movements so that the pilot hole is modified to become an enlarged orifice.

Further, in at least some such example embodiments, each of the step formations includes a respective plurality of steps that includes a respective second step in addition to the respective first step, and wherein the respective first step of each of the step formations is located at a respective first distance from the face that is less than a respective second distance from the face at which the respective second step of the respective step formation is located, and wherein the respective first step of each of the step formations is located at a respective third distance from the central axis that is less than a respective fourth distance from the central axis at which the respective second step of the respective step formation is located. Also, the machining method additionally comprises further moving the toolholder toward the workpiece so that the stepped rotary broach proceeds at least partly through or into the workpiece and the respective second steps of the respective step formations following the respective first steps further progressively cut away at the workpiece due to the one or more wobbling movements until the outer surface passes at least partly through or into the workpiece so that the enlarged orifice becomes a final orifice.

BRIEF DESCRIPTION OF THE DRAWINGS

A more complete understanding of the embodiments, and the attendant advantages and features thereof, will be more readily understood by references to the following detailed description when considered in conjunction with the accompanying drawings wherein:

FIG. 1 illustrates a front elevation view of a typical (Prior Art) hexalobe (or hexalobular) form, where splines (or lobes) on the hexalobe form are respectively represented by respective protrusions around a perimeter;

FIG. 2 illustrates a front elevation view of a typical (Prior Art) polygonal shape (or form) having edges and corners (in contrast to a spline-based shape);

FIG. 3 illustrates a front elevation view of a typical (Prior Art) involute form, in which splines on the involute form are respectively represented by respective protrusions around the periphery;

FIG. 4 illustrates a front elevation view of a typical (Prior Art) serration form, in which splines on the serration form are respectively represented by respective point protrusions around the periphery (with it being appreciated that some splines on serration forms have truncated tips and do not necessarily come to sharp points);

FIG. 5 illustrates a front perspective view of a Prior Art hexalobe rotary broach;

FIG. 6 illustrates a front perspective view of a Prior Art polygonal rotary broach;

FIG. 7 illustrates a front perspective view of a Prior Art involute rotary broach;

FIG. 8 illustrates a front perspective view of a Prior Art serration rotary broach;

FIG. 15 illustrates a detail view (or an enlarged fragmentary perspective view) of a portion of the front perspective view of the hexalobe stepped rotary broach shown in FIG. 9;

6

Figures 9, 10, 11, 12, 13, 14:
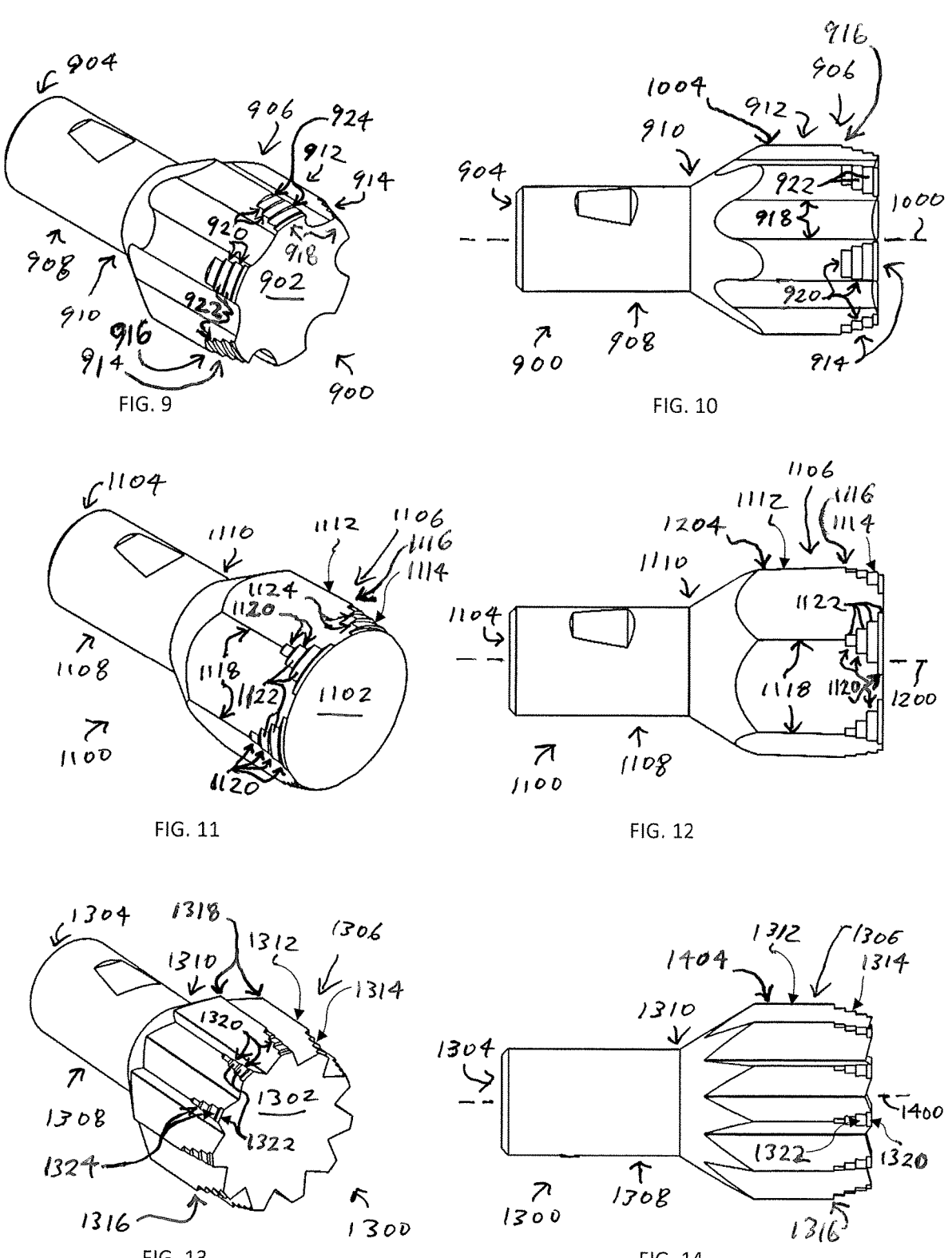
FIG. 9 illustrates a front perspective view of a hexalobe stepped rotary broach, in accordance with an example embodiment encompassed herein.
FIG. 10 illustrates a left side elevation view of the hexalobe stepped rotary broach of FIG. 9.
FIG. 11 illustrates a front perspective view of a polygonal stepped rotary broach, in accordance with an example embodiment encompassed herein.
FIG. 12 illustrates a left side elevation view of the polygonal stepped rotary broach of FIG. 11.
FIG. 13 illustrates a front perspective view of a serration stepped rotary broach, in accordance with an example embodiment encompassed herein.
FIG. 14 illustrates a left side elevation view of the serration stepped rotary broach of FIG. 14.
Figure 21:
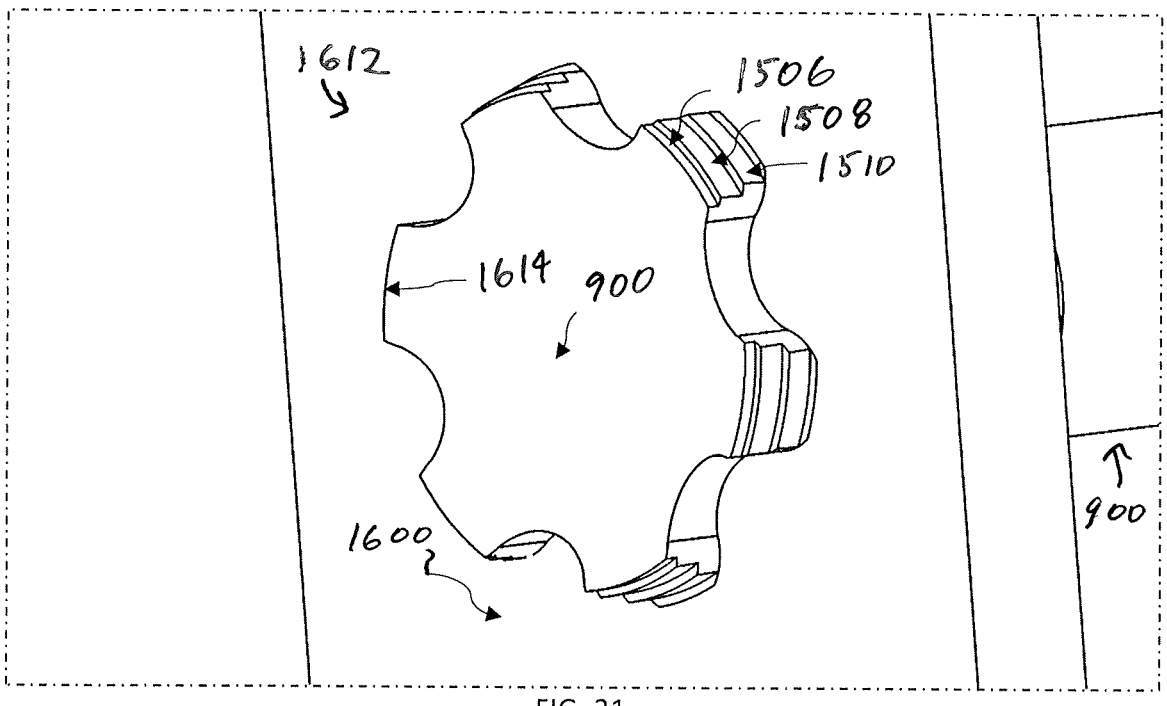
Figure 22:
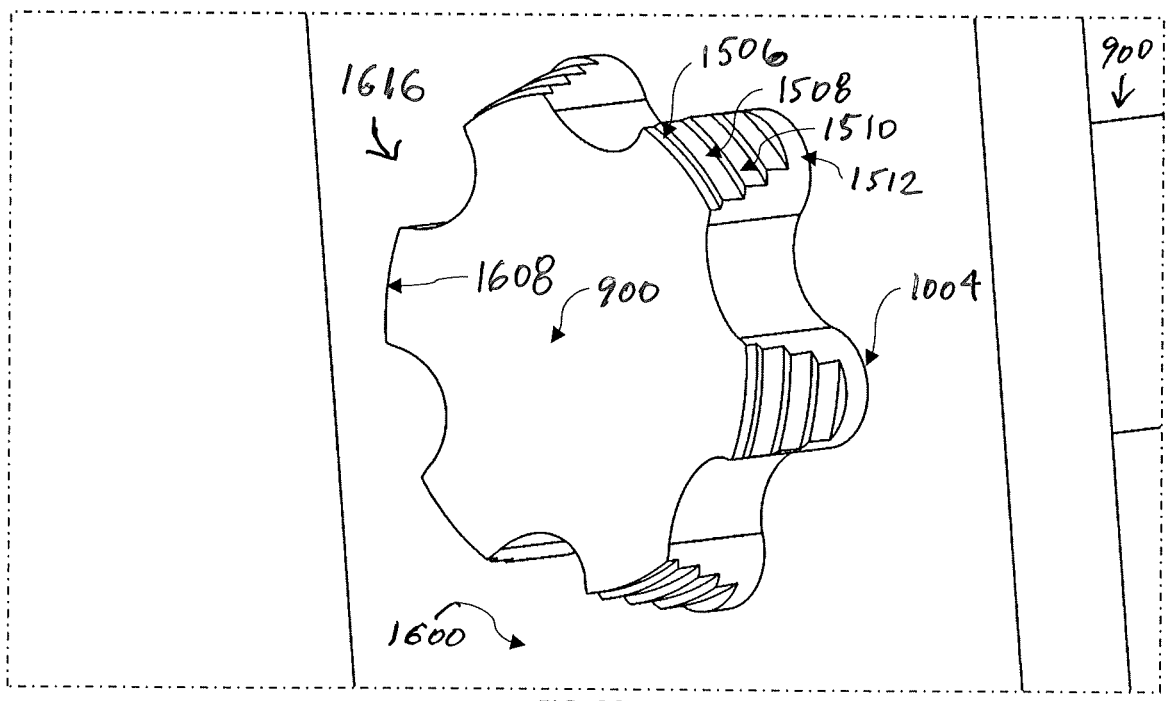

FIG. 16 illustrates an example perspective view of the hexalobe stepped rotary broach shown in FIG. 9, FIG. 10, and FIG. 15, in relation to a workpiece, at a first time before beginning broaching;

FIG. 17 illustrates an example perspective view of the hexalobe stepped rotary broach and the workpiece of FIG. 16, at a second time when broaching begins;

FIG. 18 illustrates an example perspective view of the hexalobe stepped rotary broach and the workpiece of FIG. 16 and FIG. 17, at a third time in which the workpiece has been partially broached;

FIG. 19 illustrates an example perspective view of the hexalobe stepped rotary broach and the workpiece of FIG. 16, FIG. 17, and FIG. 18, at a fourth time after broaching has completed;

FIG. 20 illustrates a rear perspective view of a back of the workpiece and a portion of the hexalobe stepped rotary broach at the third time (or substantially the same time as the third time) with respect to which FIG. 18 pertains, when the hexalobe stepped rotary broach begins penetration of the workpiece during broaching;

FIG. 21 illustrates a rear perspective view of the back of a modified version of the workpiece shown in FIG. 20, when a medium portion (e.g., about half) of a cutting portion of the hexalobe stepped rotary broach of FIG. 18 penetrates the workpiece during broaching; and FIG. 22 illustrates a rear perspective view of the back of a further modified version of the workpiece shown in FIG. 20 and FIG. 21, when the hexalobe stepped rotary broach has fully penetrated the workpiece during broaching.

DETAILED DESCRIPTION

The present inventor has recognized the above-described disadvantages associated with conventional rotary broaches, and conventional methods and systems that employ such conventional rotary broaches. Indeed, the present inventor has recognized that, in conventional or prior art embodiments of rotary broaches (and methods and systems employing rotary broaches), there is only a single form cut per rotary broach, and the final form is the only form that is cut. Given this to be the case, conventional rotary broaches are unable to accommodate or achieve larger form sizes when used alone and so, to achieve larger form sizes, multiple (or sets of) rotary broaches need to be used. Yet, as already described, the use of a number of rotary broaches to achieve a final form increases machining time and machine load.

In view of these disadvantages associated with conventional rotary broaches (and conventional methods and systems employing such conventional rotary broaches), the present inventor has further recognized that one or more of such disadvantages can be overcome by configuring a single rotary broach to have outer dimensions that progressively change as one proceeds along the length of the rotary broach, or parallel to a central axis of the rotary broach. In at least some such embodiments, the progressive changes can include progressive step changes (or steps) in outer dimension(s) or in the outer cross-section of the rotary broach that occur as one proceeds along the length of the rotary broach, or parallel to a central axis of the rotary broach. In at least some such embodiments, the rotary broach is configured to have progressive step changes in which outer dimension(s) or the outer cross-section of the rotary broach progressively get larger as one proceeds from an initial contact face (or end, tip, or front surface) of the rotary broach axially toward a support end of the rotary broach.

In at least some example embodiments encompassed herein, a stepped rotary broach includes a shaft including a planar, conical, or dished front surface with a series of stepped cutting edges arranged along its periphery, each corresponding to a different stepped profile. The broach can be designed for use in machining operations to create precise shaped features in workpieces. The broach can be controlled by a wobbling mechanism that enables controlled eccentric movement of the cutting section during rotation. The stepped rotary broach can provide a versatile and efficient solution for producing large or deep profiles in a workpiece that traditional rotary broaches cannot achieve, and/or can eliminate the need for multiple machining processes or otherwise enhance machining or manufacturing operations.

The present disclosure is intended to encompass numerous different embodiments of rotary broaches, as well as numerous different embodiments of methods and/or systems employing rotary broaches. Although specific details of a single embodiment or a variety of embodiments are described herein or are set forth in this application, it should be appreciated that any specific details of the embodiments described herein are provided as examples or for demonstration or illustration purposes only, and accordingly no unnecessary limitation(s) or inference(s) are to be understood or imputed therefrom.

Before describing in detail several exemplary embodiments, it is noted that the present disclosure encompasses embodiments that reside primarily in combinations of components related to particular devices and systems. Accordingly, in at least some cases, the device components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

In general, at least some embodiments encompassed herein relate to rotary broaching systems and methods in which a rotary broach is mounted or supported in relation to a toolholder in a manner such that, when the toolholder is actuated and the rotary broach is directed to contact and proceed into and through a workpiece, the rotary broach moves relative to the workpiece so as to create a desired form within the workpiece. A significant operational aspect of such rotary broaching systems and methods is the rotary or wobbling motion of the rotary broach itself. The eccentricity of the toolholder causes the rotary broach to wobble. This wobbling motion is a slight deviation from the true rotational axis, creating a circular path for the cutting edges of the rotary broach as it is rotated through a workpiece.

More particularly, as used herein, the term "workpiece" refers to a medium or structure in (or into, or around, or with respect to) which a broach cuts. For example, the workpiece may be (or take) a metal, metal alloy, or other solid form. Likewise, the broach may also be (or take) a metal, metal alloy, or other solid form. Also as used herein, the term "toolholder" refers to an apparatus typically including (or comprising, or consisting of) a bearing or bushing that holds, or is configured to hold or support, a rotary broach securely while allowing it to rotate freely. Typically, the bearing or bushing is eccentrically mounted within or on (or in relation to) the toolholder. That is, the bearing or bushing is mounted in a manner such that it is not perfectly centered (e.g., centered relative to a central axis of the toolholder). This manner of mounting the bearing or bushing relative to the toolholder has a unique effect of allowing a rotary broach supported by the bearing or bushing to achieve controlled wobbling. Accordingly, the toolholder is designed with a built-in offset or eccentricity that causes the broach to wobble slightly as it rotates.

Further, at least some embodiments provided herein relate to one or more stepped rotary broaches. In at least some embodiments described herein, a stepped rotary broach is a rotary broach that includes forms, diameters, outer surfaces, perimeters, circumferences, or peripheries having increasing sizes (e.g., with successively-larger forms, diameters, perimeters, or circumferences) as one proceeds along or parallel to a central axis of the stepped rotary broach from a face of the stepped rotary broach toward a location or portion at which the stepped rotary broach is to be supported by a toolholder. Given such a configuration, the forms, diameters, outer surfaces (e.g., radially-outwardly-facing surfaces), perimeters, circumferences, or peripheries of the stepped rotary broach, when interacting with a workpiece, progressively cut the desired form into the workpiece as the rotary broach is inserted into and through the workpiece. Each form or diameter of the stepped rotary broach is progressively larger than the previous one in order to cut a progressively larger portion of the final form. Such stepped rotary broaches are configured to be directed into and through a hole formed within a workpiece so that, as the stepped rotary broach proceeds progressively into and through the hole, progressively-larger ones of the forms, diameters, outer surfaces, perimeters, circumferences, or peripheries come into contact with, cut, and progressively enlarge the hole to take a desired form. Stepped rotary broaches that are configured to operate in this manner relative to a workpiece can be referred to as "internal" stepped rotary broaches.

Notwithstanding the above discussion, the present disclosure also encompasses alternate embodiments in which a rotary broach is an "external" stepped rotary broach. In such alternate embodiments, the stepped rotary broach can be configured to have an interior orifice or channel in which the orifice includes internal forms, inner diameters, or inner surfaces (e.g., radially-inwardly-facing surfaces) of progressively decreasing size as one proceeds along or parallel to a central axis of the stepped rotary broach from a face of the stepped rotary broach toward a location or portion at which the stepped rotary broach is to be supported by a toolholder. Further, the present disclosure also envisions that any of a variety of alternative methods may be used during the machining process. For example, when making externally broached forms, the broach (or broach form) may be wrapped around the workpiece as an external broach and wobbled while rotating. In this case, because the inside of the now "external" rotary broach has internal forms (or inner diameters or surfaces) that are stepped, operation of the rotary broach results in the cutting of progressively smaller (or, depending upon the viewpoint, larger) forms on the outside of the workpiece as each step progressively cuts the final desired form into the workpiece.

Referring now to FIG. 9, FIG. 10, FIG. 11, FIG. 12, FIG. 13, and FIG. 14, several example embodiments of stepped rotary broaches encompassed by the present disclosure are illustrated. FIG. 9 shows a front perspective view of a hexalobe stepped rotary broach 900, and FIG. 10 shows a left side elevation view of the hexalobe stepped rotary broach 900. Additionally, FIG. 11 shows a front perspective view of a polygonal stepped rotary broach 1100, and FIG. 12 illustrates a left side elevation view of the polygonal stepped rotary broach 1100. Further, FIG. 13 shows a front perspective view of a serration stepped rotary broach 1300, and FIG. 14 shows a left side elevation view of the serration stepped rotary broach 1300.

As shown in FIG. 9, FIG. 10, FIG. 11, FIG. 12, FIG. 13, and FIG. 14 and described in further detail below, each of the hexalobe, polygonal, and serration stepped rotary broaches 900, 1100, and 1300, respectively, extends axially along a respective central axis 1000, 1200, and 1400, respectively (see particularly FIG. 10, FIG. 12, and FIG. 14). More particularly, each of the hexalobe, polygonal, and serration stepped rotary broaches 900, 1100, and 1300, respectively, extends axially along the respective central axis 1000, 1200, and 1400, respectively, from a respective face 902, 1102, and 1302, respectively, to a respective distal end 904, 1104, and 1304, respectively. Further as shown, each of the hexalobe, polygonal, and serration stepped rotary broaches 900, 1100, and 1300, respectively, includes a respective contact (or cutting) portion 906, 1106, and 1306, respectively, and a respective support portion 908, 1108, and 1308, respectively.

The respective faces 902, 1102, and 1302 of the respective stepped rotary broaches 900, 1100, and 1300 are the surfaces of those respective stepped rotary broaches that first come into contact with a workpiece 1600 (see, e.g., FIG. 16) when the respective stepped rotary broaches are implemented or used to cut or form the workpiece. Although the respective faces 902, 1102, and 1302 are shown to be planar surfaces in the present embodiments, any of the respective faces can also take other forms such as conic or dished (e.g., concave or convex) surfaces. The respective faces 902, 1102, and 1302 are the respective leading edge surfaces of the respective contact portions 906, 1106, and 1306 of the respective stepped rotary broaches 900, 1100, and 1300, respectively. The respective contact portions 906, 1106, and 1306 respectively extend axially from the respective faces 902, 1102, and 1302 up to respective midregions 910, 1110, and 1310 of the respective stepped rotary broaches 900, 1100, and 1300.

The respective support portions 908, 1108, and 1308 respectively extend axially from the respective midregions 910, 1110, and 1310 of the respective stepped rotary broaches 900, 1100, and 1300 to the respective distal ends 904, 1104, and 1304. In the present example embodiments of FIG. 9, FIG. 10, FIG. 11, FIG. 12, FIG. 13, and FIG. 14, the respective support portions 908, 1108, and 1308 are respective cylindrical shaft portions that have respective diameters that are less than respective outermost diameters of the respective contact portions 906, 1106, and 1306. The respective support portions 908, 1108, and 1308 are the respective portions of the respective stepped rotary broaches 900, 1100, and 1300 at (or along) which the respective rotary broaches are in contact with or supported by (at least directly) a toolholder of the machine (not shown) that operates to cause rotation and wobbling of the respective stepped rotary broaches during operation. Notwithstanding the above description, the present disclosure also encompasses alternate embodiments of stepped rotary broaches having respective support portions that are other than cylindrical in shape, or that have outer diameters (or outermost surfaces) that are greater than (or extend outward from a central axis farther than) outermost surfaces of respective contact portions of those stepped rotary broaches.

As for the respective contact portions 906, 1106, and 1306 of the respective stepped rotary broaches 900, 1100, and 1300, in the embodiments shown in FIG. 9, FIG. 10, FIG. 11, FIG. 12, FIG. 13, and FIG. 14, the respective contact portions 906, 1106, and 1306 generally have respective stepped outermost surfaces or peripheries 912, 1112, and 1312. That is, the contact portion 906 has the stepped periphery 912 that is a hexalobe periphery, the contact portion 1106 has the stepped periphery 1112 that is a polygonal (in this example, hexagonal) periphery, and the contact portion 1306 has the stepped periphery 1312 that is a serration periphery. The respective peripheries 912, 1112, and 1312 are respectively radially outwardly-positioned relative to the respective central axes 1000, 1200, and 1400, respectively, by comparison with the respective support portions 908, 1108, and 1308, respectively. As shown, each of the respective stepped peripheries 912, 1112, and 1312 extend generally axially away from the respective faces 902, 1102, and 1302 toward the respective midregions 910, 1110, and 1310.

The respective peripheries 912, 1112, and 1312 of the respective stepped rotary broaches 900, 1100, and 1300 have shapes that respectively conform, generally or to a significant extent in terms of their respective cross-sectional shapes, to the respective peripheries 104, 204, and 404 of the respective hexalobe, polygonal (in this example, hexagonal), and serration forms 100, 200, and 400 shown in FIG. 1, FIG. 2, and FIG. 4, respectively. In particular, respective outer surfaces 1004, 1204, and 1404 (see particularly FIG. 10, FIG. 12, and FIG. 14) of the respective peripheries 912, 1112, and 1312 have respective cross-sectional shapes that conform to the respective peripheries 104, 204, and 404. However, in the present embodiments, the respective peripheries 912, 1112, and 1312 differ from the respective peripheries 104, 204, and 404 of the respective hexalobe, polygonal (in this example, hexagonal), and serration forms 100, 200, and 400 in that the respective peripheries 912, 1112, and 1312 also include respective step formations 914, 1114, and 1314, respectively.

As shown, the respective step formations 914, 1114, and 1314 in the present embodiments generally begin at the respective faces 902, 1102, and 1302 and extend along the respective stepped peripheries 912, 1112, and 1312 of the respective contact portions 906, 1106, and 1306, toward the respective midregions 910, 1110, and 1310 and up to respective end locations 916, 1116, and 1316, respectively. The respective step formations 914 of the periphery 912 of the hexalobe stepped rotary broach 900 are particularly formed along respective protrusions 918 of that periphery. Similarly, the respective step formations 1114 of the periphery 1112 of the polygonal stepped rotary broach 1100 are particularly formed along respective corners 1118 of that periphery. Further, the respective step formations 1314 of the periphery 1312 of the serration stepped rotary broach 1300 are particularly formed along respective point protrusions 1318 of that periphery. In the present embodiments, there are six of the protrusions 918 and correspondingly six of the step formations 914, there are six of the corners 1118 and correspondingly six of the step formations 1114, and there are eleven of the point protrusions 1318 and correspondingly eleven of the step formations 1314.

Additionally as shown, it should be appreciated that each of the step formations 914, 1114, and 1314 includes a respective series of two or more steps 920, 1120, and 1320, respectively. Each of the steps 920, 1120, and 1320 includes a respective substantially flat circumferential surface region 922, 1122, and 1322, respectively, which extends parallel to the respective central axis 1000, 1200, and 1400 of the respective stepped rotary broach 900, 1100, and 1300 on which the respective step is formed, and which also extends circumferentially around (or about or along) the respective central axis. In the present embodiments, each of the surface regions 922, 1122, and 1322 has a slight curvature as the respective step extends around the respective central axis 1000, 1200, and 1400. The amount of curvature of each of the surface regions 922, 1122, and 1322 around the respective central axis 1000, 1200, and 1400 can vary depending upon the embodiment. In the present embodiment, the curvature of each of the surface regions 922, 1122, and 1322 is less than the curvature of a circle extending about the respective central axis having a radius equaling (or substantially equaling) the distance of the respective step from the respective central axis. In some other embodiments, respective steps can include respective planar surfaces that are tangent to respective imaginary cylindrical surfaces formed about the respective central axes.

It will be appreciated from FIG. 9, FIG. 10, FIG. 11, FIG. 12, FIG. 13, and FIG. 14 that the respective surface regions 922, 1122, and 1322 of different ones of the steps 920, 1120, and 1320 of each respective one of the step formations 914, 1114, and 1314 are respectively positioned generally at different distances from (e.g., at different radial distances) relative to the respective central axes 1000, 1200, and 1400 around (or about or along) which those respective surface regions extend. More particularly, in these embodiments, respective ones of the surface regions 922, 1122, and 1322 of respective ones of the step formations 914, 1114, and 1314 that are positioned closer (e.g., axially closer) to the respective faces 902, 1102, and 1302 of the respective stepped rotary broaches 900, 1100, and 1300 are also positioned closer to the respective central axes 1000, 1200, and 1400 around which those respective surface regions extend than are respective ones of the surface regions of those step formations that are positioned farther (e.g., axially farther) from the respective faces.

Accordingly, each of the respective series of two or more of the steps 920, 1120, and 1320 of each of the step formations 914, 1114, and 1314 of each of the respective stepped rotary broaches 900, 1100, and 1300 includes a respective series of two or more of the surface regions 922, 1122, and 1322, respectively, in which successive ones of the respective surface regions of each respective step formation that are successively positioned farther from the respective face 902, 1102, or 1302 of the respective stepped rotary broach are successively or progressively positioned radially farther outward from the respective central axis 1000, 1200, and 1400 of that respective stepped rotary broach. It should be appreciated too that, due to the respective shapes of the respective outer surfaces 1004, 1204, or 1404 of the respective peripheries 912, 1112, or 1312 of the respective stepped rotary broaches 900, 1100, or 1300, the respective surface regions 922, 1122, and 1322 of each respective one of the step formations 914, 1114, and 1314 tend to decrease in length, in terms of the lengths of the respective surface regions around the respective central axes 1000, 1200, and 1400, as one proceeds away from the respective faces 902, 1002, and 1302 toward and up to the respective end locations 916, 1116, and 1316.

Further, each of the steps 920, 1120, and 1320 of each of the step formations 914, 1114, and 1314 of each of the respective stepped rotary broaches 900, 1100, and 1300 can be understood to also include, in addition to a respective one of the surface regions 922, 1122, and 1322, a respective substantially flat radial connecting region 924, 1124, and 1324, respectively. Each of the respective connecting regions 924, 1124, and 1324 of each of the steps 920, 1120, and 1320 in the present embodiments is a respective surface portion that couples the respective surface region 922, 1122, and 1322 of that respective step with another one of the respective surface regions 922, 1122, and 1322 of a neighboring step of the same respective step formation 914, 1114, and 1314, or that couples the respective surface region of that respective step with the respective outer surface 1004, 1204, or 1404 of the respective periphery 912, 1112, or 1312 of the respective stepped rotary broach 900, 1100, or 1300 (e.g., where that respective step is that final one of the steps of the respective step formation, farthest from the respective face 902, 1102, or 1302 of that stepped rotary broach).

It should be appreciated that each of the respective steps 920, 1120, and 1320 of the respective step formations 914, 1114, and 1314 generally, and each of the respective surface regions 922, 1122, and 1322 of each of those steps particularly, is closer (e.g., radially closer) to the respective central axis 1000, 1200, and 1400 of the stepped rotary broach 900, 1100, 1300 on which those steps and surface regions are provided, than the outermost portions of the respective outer surfaces 1004, 1204, and 1404 of those respective stepped rotary broaches (other than at the end locations 916, 1116, and 1316 at which the respective step formations adjoin or interface the respective outer surfaces). This is not to say that all portions of the outer surfaces 1004, 1204, and 1404 of the respective stepped rotary broaches 900, 1100, and 1300 necessarily are positioned farther from the respective central axes 1000, 1200, and 1400 than all of the respective steps of the respective step formations 914, 1114, and 1314 of those broaches. Rather, this is to say that, in the present embodiments, the respective portions of the respective outer surfaces 1004, 1204, and 1404 that are nearest to the respective step formations 914, 1114, and 1314, for example in terms of circumferential alignment about the respective central axes 1000, 1200, and 1400, are positioned farther from the respective central axes than are the respective steps of those respective step formations.

For example, the respective steps 920 of each respective step formation 914 of the hexalobe stepped rotary broach 900 are more closely positioned to the central axis 1000 of that broach than is the respective protrusion 918 with respect to which those steps are circumferentially aligned (that is, the respective protrusion adjoining the respective step formation at a respective one of the end locations 916). Likewise the respective steps 1120 of each respective step formation 1114 of the polygonal stepped rotary broach 1100 are more closely positioned to the central axis 1200 of that broach than is the respective corner 1118 with respect to which those steps are circumferentially aligned (that is, the respective corner adjoining the respective step formation at a respective one of the end locations 1116). Additionally, the respective steps 1320 of each respective step formation 1314 of the serration stepped rotary broach 1300 are more closely positioned to the central axis 1400 of that broach than is the respective point protrusion 1318 with respect to which those steps are circumferentially aligned (that is, the respective point protrusion adjoining the respective step formation at a respective one of the end locations 1316).

More particularly with respect to FIG. 15, an additional perspective detail view 1500 of the front of the stepped rotary broach 900 of FIG. 9 and FIG. 10 is provided to further illustrate features of the contact portion 906 of that stepped rotary broach. The detail view 1500 of FIG. 15 particularly corresponds to a portion of FIG. 9, in terms of the perspective orientation that is illustrated. As shown, the contact portion 906 of the stepped rotary broach 900 includes the face 902 that in the present embodiment is a planar front surface (albeit, in alternate embodiments, that face can take other forms such as a conic or dished front surface), which is shown to have a perimeter 1502. Further as shown, the contact portion 906 includes the outer surface 1004 and the step formations 914 that are arranged to extend from the face toward (but not up to) the midregion 910. In the present example, the contact portion 906 includes six of the step formations 914 respectively formed along respective ones of the protrusions 918 of the outer surface 1004 given the hexalobe form of the contact portion.

Additionally as shown, the two or more of the steps 920 of each of the step formations 914 includes four of the steps 920, namely, first, second, third, and fourth steps 1506, 1508, 1510, and 1514. Each of the first, second, third, and fourth steps 1506, 1508, 1510, and 1512 has a respective one of the surface regions 922 and a respective one of the connecting regions 924. The respective first, second, third, and fourth steps 1506, 1508, 1510, and 1512 of each of the step formations 914 are arranged to extend in succession from the face 902 toward the midregion 910, up to the respective locations 916 at which the respective step formations respectively merge into the respective protrusions 918 of the outer surface 1004. Each of the respective first, second, third, and fourth steps 1506, 1508, 1510, and 1512 of each of the step formations 914 is provided so as to extend around the central axis 1000 of the stepped rotary broach 900 (and around the periphery 912).

It should be appreciated that the respective first, second, third, and fourth steps 1506, 1508, 1510, and 1512 of each of the step formations 914 successively are positioned farther radially outward from the central axis 1000. Thus, the respective second steps 1508 of each of the step formations 914 are illustrated as being positioned farther radially outward from the central axis 1000 (and as having a larger diameter) than the respective first steps 1506 of those respective step formations 914. Also, the respective third steps 1510 of each of the step formations 914 are illustrated has being positioned farther radially outward from the central axis 1000 (and as having a larger diameter) than the respective second steps 1508 of those respective step formations 914, and the respective fourth steps 1512 of each of the step formations 914 are illustrated has being positioned farther radially outward from the central axis 1000 (and has having a larger diameter) than the respective third steps 1510 of those respective step formations 914.

Correspondingly, and given the overall shape of the contact portion 906 and the outer surface 1004 thereof, the respective surface regions 922 of the first, second, third, and fourth steps 1506, 1508, 1510, and 1512 of each of the step formations 914 not only are positioned progressively farther radially outward from the central axis 100, but also are progressively smaller in terms of the extent to which those respective surface regions extend around the central axis 1000. That is, in each of the step formations 914, the surface region 922 of the first step 1506 extends around the central axis 1000 to a greater extent than does the surface region 922 of the second step 1508, which in turn extends around the central axis to a greater extent than does the surface region 922 of the third step 1510, which in turn extends around the central axis to a greater extent than does the surface region 922 of the fourth step 1510. Relatedly, in each of the step formations 914, the connecting region 924 of the first step 1506 extends around the central axis 1000 to a greater extent than does the connecting region 924 of the second step 1508, which in turn extends around the central axis to a greater extent than does the connecting region 924 of the third step 1510, which in turn extends around the central axis to a greater extent than does the connecting region 924 of the fourth step 1510. The respective end locations 916 are formed at the respective junctions between the respective connecting regions 924 of the respective fourth steps 1512 of each of the step formations 914 and the respective protrusions 918 of the outer surface 1004.

Notwithstanding these embodiments, the present disclosure also encompasses numerous other embodiments with one or more features that differ from those described above. As noted above, the steps 920, 1120, and 1320 can have varying degrees of curvature in terms of how the steps curve about the respective central axes 1000, 1200, and 1400. Also, the present disclosure includes alternate embodiments in which there are other numbers of step formations (e.g., more or less than six as shown in FIG. 15) that are provided on the contact portions of the stepped rotary broaches, or in which step formations are formed along other regions of the contact portions of various types of stepped rotary broaches.

Additionally, the present disclosure includes alternate embodiments in which there are other numbers of steps within any given step formation (e.g., more or less than four, or even less than two). For example, although the step formations 914, 1114, and 1314 particularly each have four steps, in other embodiments subsequent steps (e.g., fifth or more steps) can be positioned along the length of the stepped rotary broaches 900, 1100, and 1300. Further, the axial length (or width) of any given step (or surface region thereof), or of the steps of any given step formation, can vary depending upon the embodiment. Although in some embodiments each of the steps of a given step formation can have surface regions that have a constant axial length and/or connecting regions that have a constant radial length, in other embodiments different steps of a given step formation can have differently-sized surface regions and/or connecting regions. Also, in at least some embodiments encompassed herein, each stepped cutting edge comprises a stepped profile with a constant pitch angle and a varying depth.

Turning to FIG. 16, FIG. 17, FIG. 18, and FIG. 19, exemplary perspective views are provided showing the stepped rotary broach 900 of FIG. 9, FIG. 10, and FIG. 15 in relation to the workpiece 1600 at four different times, so as to illustrate example operation of the stepped rotary broach in terms cutting or broaching the workpiece. More particularly, FIG. 16 illustrates the stepped rotary broach 900 in relation to the workpiece 1600 at a first time before beginning broaching. FIG. 17 illustrates the stepped rotary broach 900 in relation to the workpiece 1600 at a second time when broaching begins (or is just beginning). FIG. 18 illustrates the stepped rotary broach 900 in relation to the workpiece 1600 at a third time when the workpiece has been partially broached (but when the broaching process has not yet been completed. Further, FIG. 19 illustrates the stepped rotary broach 900 in relation to the workpiece 1600 at a fourth time after broaching has completed.

It will be appreciated that FIG. 16, FIG. 17, FIG. 18, and FIG. 19 are figurative illustrations insofar as the stepped rotary broach 900 is not shown to be supported by any toolholder. During an actual broaching process, a toolholder would be provided to support the stepped rotary broach 900 (and would be coupled to the support portion 908 of the stepped rotary broach), and would operate to cause movement (e.g., wobbling movement) of the stepped rotary broach relative to the workpiece 1600, as well as movement toward and into/through the workpiece 1600. At the start of the broaching process, the stepped rotary broach 900 is first mounted in the machine (that is, the toolholder, not shown) at a slight angle to the workpiece 1600. By mounting the stepped rotary broach 900 in this manner, as the broach rotates due to rotation of the toolholder, the stepped rotary broach also wobbles slightly off-center due to the design of the toolholder and its mounting.

During operation or use of the stepped rotary broach 900, a pilot hole 1602 is first drilled or otherwise provided in the workpiece 1600 (e.g., by a drill, not shown), and the stepped rotary broach is brought into proximity to the workpiece 1600 and the pilot hole at a first time, as shown in FIG. 16. The stepped rotary broach 900, being held by the toolholder at a slight angle to the workpiece, is then moved to engage the edges of the pilot hole 1602 at a second time, as shown in FIG. 17. At this second time, the toolholder (or machine) is activated and the stepped rotary broach 900 beings to wobble in (or due to) the toolholder. As this happens, the first steps 1506 of the stepped rotary broach 900 engage the workpiece 1600 as the toolholder directs the stepped rotary broach to advance into the workpiece through the pilot hole 1602, generally axially along a central axis or centerline 1604 (see FIG. 16) of the pilot hole.

As the process continues, the stepped rotary broach 900 continues to wobble and also to move farther into/through the pilot hole 1602 and, by a third time, the stepped rotary broach 900 will have proceeded within the workpiece 1600 to an extent shown in FIG. 18. Upon the stepped rotary broach 900 having reached the position shown in FIG. 18, due to the movement and wobbling of the stepped rotary broach, the stepped rotary broach will have cut the workpiece 1600 so that the pilot hole 1602 has a modified shape and size corresponding to the first steps 1506 of the stepped rotary broach. The pilot hole 1602 when modified to have this modified shape and size corresponding to the first steps can be referred to as a first or initial form 1606. Subsequently, as the stepped rotary broach 900 proceeds and cuts deeper into the workpiece 1600, the second steps 1508 (which are larger than the first steps 1506, as shown in FIG. 15) engage the workpiece (or part) 1600 in the locations of the first steps 1506, such that the pilot hole 1602 is further modified to take on a progressively larger or second form corresponding to those second steps.

This process continues with each subsequent group of corresponding ones of the steps 920 successively engaging the workpiece 1600 and passing through a progressively larger orifice that began as the pilot hole 1602, as the stepped rotary broach continues to be wobbled and also directed to move axially along the central axis 1604 farther into and through the workpiece. That is, in the present embodiment, following the cutting of the workpiece 1600 by the second steps 1508, next the third steps 1510 are directed to engage and proceed to cut the workpiece, and then further the fourth steps 1512 are directed to engage and cut the workpiece. Finally, after all of the steps 920 have engaged and cut the workpiece 1600, the outer surface 1004 of the periphery 912 of the cutting portion 906 also engages the workpiece and passes through the enlarged orifice that began as the pilot hole 1602. This enlarged orifice, through which the cutting portion 906 of the stepped rotary broach 900 as a whole (e.g., including the outer surface 1004 of the periphery 912, which has the greatest-diameter-extent of the cutting portion 906) is able to pass, can be considered the final modified form of the pilot hole, or a final orifice 1608. After the final orifice 1608 has been cut, the stepped rotary broach 900 is extracted from the workpiece 1600 at a fourth time as illustrated by FIG. 19, leaving the final orifice 1608 within the workpiece 1600 having the final, desired form.

Further with respect to the broaching process, FIG. 20, FIG. 21, and FIG. 22 are additionally provided to illustrate how the pilot hole 1602 is modified by the insertion and wobbling of the stepped rotary broach 900 at different times. FIG. 20 provides a rear perspective view of a back surface 1610 of the workpiece 1600 and a portion of the stepped rotary broach 900 at the third time (or substantially the same time as the third time) with respect to which FIG. 18 pertains, when the stepped rotary broach begins penetration of the workpiece during broaching. More particularly, FIG. 20 illustrates how, after the periphery 912 of the stepped rotary broach 900 is wobbled around the central axis 1604 of the pilot hole 1602 and the first steps 1506 cut into the workpiece 1600, the pilot hole within the workpiece 1600 is modified to have the initial form 1606 (having a first outer diameter corresponding to the surface portions of the first steps 1506).

Additionally, FIG. 21 provides a rear perspective view of a back surface 1612 of a modified version of the workpiece 1600 shown in FIG. 20, when a medium portion (e.g., about half) of the cutting portion 906 of the stepped rotary broach 900 of FIG. 18 penetrates the workpiece during broaching. More particularly, FIG. 21 illustrates how, as the stepped rotary broach 900 is advanced further into the workpiece 1600 along the central axis 1604 and wobbled after the third time, cutting continues and the respective second and third steps 1508 and 1510 engage the workpiece 1600 (or part) in the respective locations of the first steps 1506, cutting a progressively larger form 1614 (e.g., a larger orifice than that of the initial form 1606).

This process, in which the stepped rotary broach 900 is both advanced further into the workpiece 1600 along the central axis 1604 and wobbled, continues until the stepped rotary broach 900 is fully inserted into the workpiece 1600 and the final orifice (or final form) 1608 is achieved. FIG. 22 particularly illustrates a rear perspective view of a back surface 1616 of a further modified version of the workpiece 1600 shown in FIG. 20 and FIG. 21, when the stepped rotary broach 900 has fully penetrated the workpiece during broaching, such that each of the first, second, third, and fourth steps 1506, 1508, 1510, and 1512 as well as (at least part of) the outer surface 1004 of the contact portion 906 have passed through the workpiece. As shown in FIG. 22, when the stepped rotary broach 900 has proceeded to the extent that even the outer surface 1004 (at least partly) has passed through the workpiece, this results in completion/production of the final orifice 1608 (which is the same as that described in regard to FIG. 19 as being present at the fourth time).

It should be appreciated that, although the polygonal and serration stepped rotary broaches 1100 and 1300 have peripheries 1112 and 1312 and step formations 1114 and 1314 that differ from the periphery 912 and step formations 914 of the hexalobe stepped rotary broach 900, operation of the polygonal and serration stepped rotary broaches in relation to workpieces such as the workpieces 1600 can proceed in substantially the same manner as described in regard to FIG. 16, FIG. 17, FIG. 18, FIG. 19, FIG. 20, FIG. 21, and FIG. 22. For example, the polygonal stepped rotary broach 1100 includes the step formations 1114 each having the two or more steps 1120 that are cut into the corners 1118. As with the steps 920 of the step formations 914, the steps 1120 of the step formations 1114 allow the polygonal stepped rotary broach 1100 to cut progressively into the workpiece and modify the pilot hole 1602 as the polygonal stepped rotary broach is directed axially into the workpiece and wobbled, such that successive ones of the steps 1120 come into contact with the workpiece. Also for example, the serration stepped rotary broach 1300 includes the step formations 1314 having the two or more steps 1320 that are cut into the point protrusions 1318. As with the steps 920 of the step formations 914, the steps 1320 of the step formations 1314 allow the serration stepped rotary broach 1300 to cut progressively into the workpiece and modify the pilot hole 1602 as the serration stepped rotary broach is directed axially into the workpiece and wobbled, such that successive ones of the steps 1320 come into contact with the workpiece.

Notwithstanding the above description, the present disclosure encompasses numerous other embodiments in addition to those described above. For example, in some other embodiments encompassed herein, the rotary broaches can have other shapes or take other forms. Further for example, in some such embodiments, the rotary broaches can have cutting portions with peripheries that include outer surfaces with involute forms corresponding to the involute form 300 shown in FIG. 3, and that also include step formations that are formed along protrusions (or splines) of those involute forms. Also for example, in some other embodiments, the stepped rotary broaches can have other numbers of protrusions, corners, splines, or other features along which step formations (and steps thereof) are arranged, and/or different numbers of step formations (and steps thereof), than have been described above. Further for example, although several of the embodiments described above concern stepped rotary broaches that are internal broaches insofar as the broaches are configured to operate by being directed to pass within and through an orifice so that outwardly-facing (e.g., radially-outwardly-facing or peripheral) stepped surfaces of the broaches interact with and cut inwardly-facing (e.g., radially-inwardly-facing) surfaces of the orifice, the present disclosure also encompasses stepped rotary broaches that are external stepped rotary broaches. Such an external stepped rotary broach can include a cutting portion having an internal channel with inwardly-facing (e.g., radially-inwardly facing) stepped surfaces and can be configured to operate by moving the broach so that a shaft or other workpiece passes within the internal channel, and so the inwardly-facing (e.g., radially-inwardly-facing) stepped surfaces interact with and cut outwardly-facing (e.g., radially-outwardly-facing) surfaces of the shaft or other workpiece.

Also, in at least some example embodiments, the present disclosure relates to a stepped rotary broach comprising: a) a broach including a planar, conical or dished front surface b) a shaft having a longitudinal axis; c) a cutting section comprising a series of stepped cutting edges arranged along the periphery of the shaft, wherein each cutting edge corresponds to a different stepped profile; and d) a mounting portion configured to connect the stepped rotary broach to a rotating spindle of a machining equipment. Also, in at least some such embodiments, each stepped cutting edge comprises a stepped profile with a constant pitch angle and a varying depth. Further, in at least some such embodiments, the stepped cutting edges are formed by grinding or milling. Additionally, in at least some such embodiments, the stepped rotary broach further comprises a plurality of independent stepped cutting surfaces arranged along the shaft, each having a distinct stepped profile.

Also, in some such embodiments, the stepped rotary broach further comprises a plurality of stepped forms having a different shape than the other steps. Further, in at least some such embodiments, a spline includes a plurality of steps each configured to cut a portion of the final form in the workpiece. Additionally, in some such embodiments, the stepped rotary broach further comprises a plurality of subsequent steps having a larger diameter than the previous steps, where the stepped rotary broach is configured to manufacture internally broached forms. Also, in at least some such embodiments, the stepped rotary broach further comprises a plurality of subsequent steps having a greater size form than the previous steps, where the stepped rotary broach is configured to manufacture internally broached forms.

Additionally, in at least some such embodiments, the stepped rotary broach further comprises a plurality of subsequent steps having a smaller diameter than the previous steps, where the stepped rotary broach is configured to manufacture externally broached forms. Also, in at least some such embodiments, the stepped rotary broach further comprises a plurality of subsequent steps having a smaller size form than the previous steps, where the stepped rotary broach is configured to manufacture externally broached forms.

Further, in at least some example embodiments, the present disclosure relates to a stepped polygonal shaped rotary broach. The polygonal shaped rotary broach includes a planar, conical, or dished front surface and a perimeter, the perimeter comprising a polygonal profile. The polygonal shaped rotary broach also includes a first step forming an initial cutting surface on each corner of the polygonal shaped rotary roach to form the initial profile in the workpiece. Also, in at least some such embodiments, the polygonal includes a plurality of steps on each corner configured to cut a medium of the workpiece. Additionally, in at least some such embodiments, the stepped rotary broach further comprises a plurality of subsequent steps having a larger diameter than the previous steps, where the stepped rotary broach is configured to manufacture internally broached forms. Also, in at least some such embodiments, the stepped rotary broach further comprises a plurality of subsequent steps having a smaller diameter than previous steps, where the stepped rotary broach is configured to manufacture externally broached forms.

Additionally, in at least some example embodiments, the present disclosure relates to a stepped hexalobe rotary broach. The stepped hexalobe rotary broach includes a planar, conical, or dished front surface and a periphery, the periphery comprising a plurality of hexalobe profiles. The stepped hexalobe rotary broach also includes a first step forming an initial cutting surface of the hexalobe to form the initial profile in the workpiece. Further, in at least some such embodiments, the broach includes a plurality of steps configured to cut a medium of the workpiece. Also, in at least some such embodiments, the stepped rotary broach further comprises a plurality of subsequent steps having a larger diameter than the previous steps, where the stepped rotary broach is configured to manufacture internally broached forms. Additionally, in at least some such embodiments, the stepped rotary broach further comprises a plurality of subsequent steps having a smaller diameter than the previous steps, where the stepped rotary broach is configured to manufacture externally broached forms.

Further, in at least some example embodiments, the present disclosure relates to a method of using a stepped rotary broach such as that described in the preceding paragraphs for machining a workpiece, the method comprising: a) aligning the stepped rotary broach with the workpiece; b) rotating the stepped rotary broach and the workpiece; c) feeding the stepped rotary broach into the workpiece, causing the stepped cutting surfaces to remove material and create progressively larger features in the workpiece. Further in some such embodiments, the method includes a first step forming an initial cutting surface of the form to create the initial profile in the workpiece.

One or more of the embodiments encompassed by the present disclosure can be advantageous in any of one or more respects. For example, at least some embodiments of stepped rotary broaches encompassed herein are advantageous in that such a stepped rotary broach can be employed to cut progressively larger forms (e.g., in the case of an internal broach) or smaller forms (e.g., in the case of an external broach) into or with respect to a workpiece as the stepped rotary broach is advanced into and through or around the workpiece and wobbled. Indeed, various numbers of increasingly large diameter steps (e.g., for internal broaches) or smaller diameter steps (e.g., for external broaches) can be provided along the length of a stepped rotary broach to cut and modify a workpiece to achieve various form sizes.

Additionally for example, at least some stepped rotary broaches encompassed herein are advantageous in that such stepped rotary broaches allow for workpieces to be cut or modified to have larger final forms (e.g., in the case of an internal broach forming a final orifice) or smaller final forms (e.g., in the case of an external broach forming a final shaft) without using additional machines. Relatedly, at least some embodiments of stepped rotary broaches and associated systems and operational methods encompassed herein reduce the time required for, and/or complexity associated with, manufacturing workpieces having final forms by comparison with conventional machining techniques. Further, at least some of the stepped rotary broaches encompassed herein make it possible to cut larger forms (e.g., in terms of the depth or width of an orifice), through the use of a single broach, which would otherwise not be possible using conventional broaches or broaching machines.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

The foregoing is provided for purposes of illustrating, explaining, and describing embodiments of this disclosure. Modifications and adaptations to these embodiments will be apparent to those skilled in the art and may be made without departing from the scope or spirit of this disclosure.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety to the extent allowed by applicable law and regulations. The systems and methods described herein may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

As used herein and in the appended claims, the singular forms "a," "an," and "the" include plural referents unless the context clearly dictates otherwise.

It should be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

In many instances entities are described herein as being coupled to other entities. It should be understood that the terms "coupled" and "connected" (or any of their forms) are used interchangeably herein and, in both cases, are generic to the direct coupling of two entities (without any non-negligible (e.g., parasitic) intervening entities) and the indirect coupling of two entities (with one or more non-negligible intervening entities). Where entities are shown as being directly coupled together or described as coupled together without description of any intervening entity, it should be understood that those entities can be indirectly coupled together as well unless the context clearly dictates otherwise.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

An equivalent substitution of two or more elements can be made for any one of the elements in the claims below or that a single element can be substituted for two or more elements in a claim. Although elements can be described above as acting in certain combinations and even initially claimed as such, it is to be expressly understood that one or more elements from a claimed combination can in some cases be excised from the combination and that the claimed combination can be directed to a subcombination or variation of a subcombination.

It will be appreciated by persons skilled in the art that the present embodiment is not limited to what has been particularly shown and described herein. A variety of modifications and variations are possible in light of the above teachings without departing from the following claims. It is specifically intended that the present invention not be limited to the embodiments and illustrations contained herein, but include modified forms of those embodiments including portions of the embodiments and combinations of elements of different embodiments as come within the scope of the following claims.

What is claimed is:
1. A stepped rotary broach comprising:
a support portion configured to allow for the stepped rotary broach to be supported by a toolholder; and
a contact portion integrally formed with or coupled to the support portion, wherein the contact portion includes a face and a periphery, and extends between the face and the support portion, the support portion extending between the contact portion and a distal end of the stepped rotary broach, wherein the periphery includes an outer surface and a plurality of step formations, wherein each of the step formations extends between the face and a respective location along the periphery at which the respective step formation adjoins a respective portion of the outer surface, wherein each of the step formations includes a respective first step including a respective first surface region extending in a respective first direction about a central axis of the stepped rotary broach, and wherein the respective first surface regions of the respective first steps are respectively positioned more closely to the central axis of the stepped rotary broach than are the respective portions of the respective outer surface that respectively adjoin the respective step formations.

2. The stepped rotary broach of claim 1, wherein each of the step formations includes a respective plurality of steps including the respective first step, wherein respective successive ones of each of the plurality of steps are arranged at respective successively greater first distances from the face and also arranged at respective successively greater second distances from the central axis.

3. The stepped rotary broach of claim 1, wherein each of the step formations includes a respective plurality of steps that includes a respective second step in addition to the respective first step, wherein the respective first step of each of the step formations is located at a respective first distance from the face that is less than a respective second distance from the face at which the respective second step of the respective step formation is located, and wherein the respective first step of each of the step formations is located at a respective third distance from the central axis that is less than a respective fourth distance from the central axis at which the respective second step of the respective step formation is located.

4. The stepped rotary broach of claim 3, wherein the respective plurality of steps of each of the step formations includes, respectively, at least one additional step, in addition to the respective first step and the respective second step.

5. The stepped rotary broach of claim 3, wherein each of the second steps includes a respective second surface region extending in a respective second direction about the central axis of the stepped rotary broach, wherein each of the first steps includes a respective first connecting region and each of the second steps includes a respective second connecting region, and wherein each of the first and second connecting regions extends in a respective radially-outward direction relative to the central axis.

6. The stepped rotary broach of claim 1, wherein the stepped rotary broach is a hexalobe stepped rotary broach, and wherein the outer surface has a hexalobe form.

7. The stepped rotary broach of claim 6, wherein the outer surface having the hexalobe form includes a plurality of protrusions, and wherein each of the respective step formations is substantially circumferentially aligned about the central axis with a respective one of the protrusions.

8. The stepped rotary broach of claim 1, wherein the stepped rotary broach is a polygonal stepped rotary broach, and wherein the outer surface has a polygonal form.

9. The stepped rotary broach of claim 8, wherein the outer surface having the polygonal form includes a plurality of corners, and wherein each of the respective step formations is substantially circumferentially aligned about the central axis with a respective one of the corners.

10. The stepped rotary broach of claim 1, wherein the stepped rotary broach is a serration stepped rotary broach, and wherein the outer surface has a serration form.

11. The stepped rotary broach of claim 10, wherein the outer surface having the serration form includes a plurality of point protrusions, and wherein each of the respective step formations is substantially circumferentially aligned about the central axis with a respective one of the point protrusions.

12. The stepped rotary broach of claim 1, wherein the outer surface of the stepped rotary broach has a first form that is one of a square form, a hexagon form, a hexalobe form, a keyway form, a serration form, and an involute form, and wherein the face is one of planar, conical or dished.

13. A machining system comprising the stepped rotary broach of claim 1, and further comprising the toolholder, wherein the toolholder is configured to support the support portion of the stepped rotary broach in a skewed manner such that the central axis of the stepped rotary broach is not fully aligned with a rotational axis of the toolholder about which the stepped rotary broach spins when the toolholder is operating.

14. A stepped rotary broach comprising:

a support portion configured to allow for the stepped rotary broach to be supported by a toolholder; and a contact portion integrally formed with or coupled to the support portion, wherein the contact portion includes a face and an axially-extending surface, and extends between the face and the support portion, the support portion extending between the contact portion and a distal end of the stepped rotary broach, wherein the axially-extending surface includes a first contact surface and a plurality of step formations, wherein each of the step formations extends between the face and a respective location along the axially-extending surface at which the respective step formation adjoins a respective portion of the first contact surface, wherein each of the step formations includes respective first and second steps that each include a respective first surface region extending in a respective first direction about a central axis of the stepped rotary broach, and wherein the respective first surface regions of the respective first and second steps of the respective step formations are respectively positioned either closer to or farther from the central axis of the stepped rotary broach than are the respective portions of the respective first contact surface that respectively adjoin the respective step formations.

15. The stepped rotary broach of claim 14, wherein the stepped rotary broach is an internal stepped rotary broach, wherein the axially-extending surface is a periphery, wherein the first contact surface is an outer surface that is outwardly-facing, and wherein the respective first surface regions of the respective first and second steps of the respective step formations are respectively positioned closer to the central axis of the stepped rotary broach than are the respective portions of the respective first contact surface that respectively adjoin the respective step formations.

16. The stepped rotary broach of claim 15, wherein the outer surface has one of a hexalobe form, a polygonal form, a serration form, and an involute form.

17. The stepped rotary broach of claim 14, wherein the stepped rotary broach is an external stepped rotary broach, wherein the axially-extending surface at least in part forms an internal channel within the stepped rotary broach, wherein the first contact surface is an inner surface that is inwardly-facing, and wherein the respective first surface regions of the respective first and second steps of the respective step formations are respectively positioned farther from the central axis of the stepped rotary broach than are the respective portions of the respective first contact surface that respectively adjoin the respective step formations.

18. A machining method employing a stepped rotary broach comprising:

mounting the stepped rotary broach on a toolholder in a manner such that a central axis of the stepped rotary broach is skewed relative to a rotational axis of the toolholder, wherein the stepped rotary broach includes a support portion and a contact portion integrally formed with or coupled to the support portion, wherein the contact portion includes a face and a periphery, and extends between the face and the support portion, the support portion extending between the contact portion and a distal end of the stepped rotary broach, wherein the periphery includes an outer surface and a plurality of step formations, wherein each of the step formations extends between the face and a respective location along the periphery at which the respective step formation adjoins a respective portion of the outer surface, wherein each of the step formations includes a respective first step including a respective first surface region extending in a respective first direction about the central axis of the stepped rotary broach, and wherein the respective first surface regions of the respective first steps are respectively positioned more closely to the central axis of the stepped rotary broach than are the respective portions of the respective outer surface that respectively adjoin the respective step formations;

causing the toolholder to be activated so as to rotate the stepped rotary broach about the rotational axis;

initially moving the toolholder toward a workpiece having a pilot hole until the stepped rotary broach initially contacts the workpiece, the stepped rotary broach experiencing one or more wobbling movements relative to the workpiece due to the central axis being skewed relative to the rotational axis; and further moving the toolholder toward the workpiece so that the stepped rotary broach proceeds into the pilot hole and the step formations cut away at the workpiece due to the one or more wobbling movements so that the pilot hole is modified to become an enlarged orifice.

19. The machining method of claim 18, wherein each of the step formations includes a respective plurality of steps that includes a respective second step in addition to the respective first step, and wherein the respective first step of each of the step formations is located at a respective first distance from the face that is less than a respective second distance from the face at which the respective second step of the respective step formation is located, and wherein the respective first step of each of the step formations is located at a respective third distance from the central axis that is less than a respective fourth distance from the central axis at which the respective second step of the respective step formation is located, and wherein the machining method additionally comprises:

further moving the toolholder toward the workpiece so that the stepped rotary broach proceeds at least partly through or into the workpiece and the respective second steps of the respective step formations following the respective first steps further progressively cut away at the workpiece due to the one or more wobbling movements until the outer surface passes at least partly through or into the workpiece so that the enlarged orifice becomes a final orifice.

20. The machining method of claim 19, further comprising removing the stepped rotary broach from the workpiece, wherein the final orifice has one of a hexalobe form, a polygonal form, a serration form, or an involute form.

* * * * *